United States Patent
Serizawa et al.

(10) Patent No.: US 8,822,603 B2
(45) Date of Patent: Sep. 2, 2014

(54) RESINOUS MATERIAL FOR COVERING ELECTRIC WIRE, ELECTRIC WIRE MANUFACTURED BY USING THE RESINOUS MATERIAL FOR COVERING ELECTRIC WIRE, AND FLAME-RETARDANT CABLE

(75) Inventors: Hajime Serizawa, Tokyo (JP); Masumi Tanikita, Tokyo (JP)

(73) Assignee: Polyplastics Co., Ltd., Tokyo (JP)

( * ) Notice: Subject to any disclaimer, the term of this patent is extended or adjusted under 35 U.S.C. 154(b) by 644 days.

(21) Appl. No.: 12/918,386

(22) PCT Filed: Feb. 16, 2009

(86) PCT No.: PCT/JP2009/052501
§ 371 (c)(1),
(2), (4) Date: Aug. 19, 2010

(87) PCT Pub. No.: WO2009/104539
PCT Pub. Date: Aug. 27, 2009

(65) Prior Publication Data
US 2010/0326698 A1 Dec. 30, 2010

(30) Foreign Application Priority Data
Feb. 22, 2008 (JP) .................. 2008-041542

(51) Int. Cl.
| | |
|---|---|
| *C08L 45/00* | (2006.01) |
| *H01B 3/44* | (2006.01) |
| *C08L 31/04* | (2006.01) |
| *C08L 65/00* | (2006.01) |
| *C08L 23/02* | (2006.01) |
| *H01B 7/295* | (2006.01) |
| *C08K 3/22* | (2006.01) |
| *C08L 53/02* | (2006.01) |
| *C08L 51/00* | (2006.01) |
| *C08L 35/06* | (2006.01) |

(52) U.S. Cl.
CPC . *C08L 45/00* (2013.01); *C08K 3/22* (2013.01); *C08L 53/02* (2013.01); *H01B 3/442* (2013.01); *C08L 31/04* (2013.01); *C08L 2201/02* (2013.01); *C08G 2261/418* (2013.01); *C08L 65/00* (2013.01); *C08L 51/003* (2013.01); *C08L 23/02* (2013.01); *H01B 7/295* (2013.01); *C08L 35/06* (2013.01); *C08L 2205/03* (2013.01); *H01B 3/441* (2013.01)
USPC ........... 525/210; 525/211; 525/221; 525/222; 525/223; 525/241; 525/191

(58) Field of Classification Search
USPC ................... 525/210, 211, 221, 222
See application file for complete search history.

(56) References Cited

U.S. PATENT DOCUMENTS 6,331,591 B1 * 12/2001 Miyamoto et al. .............. 525/70
6,376,610 B1    4/2002 Dharmarajan et al.
7,799,857 B2 *  9/2010 Yasumoto ..................... 524/425

FOREIGN PATENT DOCUMENTS

| EP | 0101833 A2 | 3/1984 |
|---|---|---|
| JP | 5-112678 | 5/1993 |
| JP | 11-189743 A | 7/1999 |
| JP | 2001-135146 A | 5/2001 |
| JP | 2006-176680 A | 7/2006 |
| WO | 98/56012 A1 | 12/1998 |
| WO | 01/13381 A1 | 2/2001 |
| WO | WO 2006/123530 A1 | 11/2006 |

OTHER PUBLICATIONS

TOPAS flyer, 2006.*
International Search Report for Appln. No. PCT/JP2009/052501 mailed May 19, 2009.
Extended European Search Report issued to corresponding JP Application No. 09711978.8, mailed Jul. 29, 2011.

* cited by examiner

*Primary Examiner* — Irina Krylova
(74) *Attorney, Agent, or Firm* — Hoffmann & Baron, LLP

(57) ABSTRACT

The present disclosure provides a resinous material for covering electric wire having all required properties meeting or exceeding a certain standard, produced using a cyclic olefin-derived resin, and electric wires manufactured using the resinous material for covering electric wire, and flame-retardant cables. The resinous material including (A) an olefin-derived resin, (B) an elastomer resin, (C) a cyclic olefin-derived resin having a glass transition point of from 120° C. to 170° C., and (D) a flame retardant, the resinous material having: a content of the component (D) of from 60 parts by mass to 150 parts by mass relative to 100 parts by mass of the total contents of the components (A), (B) and (C); a tensile elongation of no less than 250%; and a heat deformation of no greater than 40%.

6 Claims, No Drawings

RESINOUS MATERIAL FOR COVERING ELECTRIC WIRE, ELECTRIC WIRE MANUFACTURED BY USING THE RESINOUS MATERIAL FOR COVERING ELECTRIC WIRE, AND FLAME-RETARDANT CABLE

CROSS REFERENCE TO RELATED APPLICATIONS

The present application claims the benefit of and priority to PCT Application No. PCT/JP2009/052501 filed on Feb. 16, 2009, which claims the benefit and priority to Japanese Application No. 2008-041542 filed on Feb. 22, 2008, the entire contents of each of which are hereby incorporated by reference.

TECHNICAL FIELD

The present disclosure relates to a resinous material for covering electric wire containing a cyclic olefin-derived resin, an electric wire manufactured by using the resinous material for covering electric wire, and a flame-retardant cable.

BACKGROUND

As covering materials of insulated wires, resin compositions prepared by blending polyvinyl chloride (PVC) with a halogen-derived flame retardant are well known.

However, when these are disposed without being subjected to an appropriate treatment, a plasticizer and/or a heavy metal stabilizer blended in the covering material may be eluted, or when these are combusted, corrosive gases and dioxins may be generated from halogen compounds included in the covering material. Thus, these problems have become a subject of discussion in recent years.

Under such circumstances, investigations of techniques for covering electric wires with a nonhalogen flame-retarding material not accompanied by possibilities of elution of deleterious heavy metals or generation of halogen based gases and the like have been initiated.

Nonhalogen flame-retarding materials attain flame retardance by blending a flame retardant not containing halogen in a resin. As the flame retardant, for example, a metal hydrate such as magnesium hydroxide and aluminum hydroxide is used, whereas polyethylene, an ethylene/1-butene copolymer, an ethylene/propylene copolymer, an ethylene/vinyl acetate copolymer, an ethylene/ethyl acrylate copolymer, an ethylene/propylene/diene ternary copolymer or the like is used as the resin.

Meanwhile, very restrict flame retardance standards, for example, Vertical Flame Test defined in UL1581 (Reference Standard for Electrical Wires, Cables, and Flexible Cords)), etc., VW-1 standard, horizontal flame retardance standard as well as 60-degree inclined flame retardant characteristic defined in JIS C3005, and the like are required for insulated wires in light of safety.

Furthermore, such materials for covering electric wires may be required to show results meeting or exceeding a certain standard in a tensile elongation test, a tensile strength test, a heat deformation test and the like defined in JIS C3005.

However, when the resinous material such as polyethylene is used, it is difficult to meet or exceed a required standard in the heat deformation test.

Exemplary resins more likely to attain a favorable physical property in the heat deformation test include cyclic olefin-derived resins, and a resinous material for covering electric wire produced using a cyclic olefin-derived resin is illustrated in Japanese Unexamined Patent Application Publication No. H11-189743, the entire contents of which is hereby incorporated by reference in its entirety.

The resinous material for covering electric wire produced using a cyclic olefin-derived resin as described can meet or exceed a required standard in the thermal deformation test; however, meeting or exceeding a required standard is difficult in the tensile elongation test, in particular. Thus, a resinous material for covering electric wire having all required physical properties meeting or exceeding a certain standard has been demanded.

SUMMARY

The present disclosure provides a resinous material for covering electric wire including an olefin-derived resin, an elastomer resin, a cyclic olefin-derived resin having a glass transition point of from 120° C. to 170° C., and a flame retardant, the resinous material having: a content of the flame retardant of from 60 parts by mass to 150 parts by mass relative to 100 parts by mass of the total contents of the olefin-derived resin, the elastomer resin, and the cyclic olefin-derived resin; wherein the resinous material includes a tensile elongation of no less than 250% and a heat deformation of no greater than 40%.

The present disclosure provides an electric wire wherein the resinous material for covering electric wire covers a conductor.

A flame-retardant cable is provided with a sheath covering the outer periphery of a single wire, the sheath being formed with the resinous material for covering electric wire.

A flame-retardant cable is provided with a sheath covering the outer periphery of an electric wire bundle of multiple electric wires, the sheath being formed with the resinous material for covering electric wire.

DETAILED DESCRIPTION

The present disclosure was made in order to solve the aforementioned problems, and an object of the disclosure is to provide a resinous material for covering electric wire having all required properties meeting or exceeding a certain standard, produced using a cyclic olefin-derived resin, and an electric wire manufactured using the resinous material for covering electric wire, and a flame-retardant cable.

The present disclosure provides a resinous material for covering electric wire containing (A) an olefin-derived resin, (B) an elastomer resin, (C) a cyclic olefin-derived resin having a glass transition point of from 120° C. to 170° C., and (D) a flame retardant, the resinous material having a content of the component (D) of from 60 parts by mass to 150 parts by mass relative to 100 parts by mass of the total content of the components (A), (B) and (C); a tensile elongation (according to JIS C3005) is no less than 250%; and a heat deformation rate (according to JIS C3005) is no greater than 40%.

A first aspect of the present disclosure provides a resinous material for covering electric wire containing (A) an olefin-derived resin, (B) an elastomer resin, (C) a cyclic olefin-derived resin having a glass transition point of from 120° C. to 170° C., and (D) a flame retardant, the resinous material having: a content of the component (D) of from 60 parts by mass to 150 parts by mass relative to 100 parts by mass of the total content of the components (A), (B) and (C); a tensile elongation (according to JIS C3005) of no less than 250%; and a heat deformation rate (according to JIS C3005) of no greater than 40%.

A second aspect of the present disclosure provides the resinous material for covering electric wire according to the first aspect, wherein the component (A) contains an olefin-derived resin having a polar group.

A third aspect of the present disclosure provides the resinous material for covering electric wire according to the first or second aspect, wherein the mass ratio of the component (A) to the combined amount of the components (B) and (C) [(A)/((B)+(C))] is from 80/20 to 60/40.

A fourth aspect of the present disclosure provides the resinous material for covering electric wire according to any one of the first to third aspects, wherein the resinous material for covering electric wire contains 25 parts by mass to 60 parts by mass of the component (B) relative to 100 parts by mass of the component (C).

A fifth aspect of the present disclosure provides the resinous material for covering electric wire according to any one of the first to forth aspects, wherein the component (B) is an olefin-derived elastomer or a styrene-derived elastomer.

A sixth aspect of the present disclosure provides the resinous material for covering electric wire according to any one of the first to fifth aspects, wherein the melt viscosity of the component (C) is no less than 96 Pa·s when the shear rate is 1,216/sec at 260° C.

A seventh aspect of the present disclosure provides an electric wire in which the resinous material for covering electric wire according to any one of the first to sixth aspects covers a conductor.

An eighth aspect of the present disclosure provides a flame-retardant cable provided with a sheath covering the outer periphery of a single wire or an electric wire bundle of multiple electric wires, the sheath being formed with the resinous material for covering electric wire according to any one of the first to sixth aspects.

According to the present disclosure, the resinous material for covering electric wire contains (A) an olefin-derived resin, (B) an elastomer resin, (C) a cyclic olefin-derived resin having a glass transition point of from 120° C. to 170° C., and (D) a flame retardant, in which: the content of the component (D) is from 60 parts by mass to 150 parts by mass relative to 100 parts by mass of the total content of the components (A), (B) and (C); the tensile elongation (according to JIS C3005) is no less than 250%; and the heat deformation rate (according to JIS C3005) is no greater than 40%; therefore, a resinous material for covering electric wire having all physical properties required for each material meeting or exceeding a certain standard, and an electric wire manufactured using the resinous material for covering electric wire, and a flame-retardant cable can be obtained.

Hereinafter, one embodiment of the present disclosure is explained in detail, but the present disclosure is not in any way limited to the following embodiment. The present disclosure can be realized with appropriate modifications within the scope of the object of the disclosure.

(A) Olefin-derived Resin

Polyolefin-derived resin is a polymerization product of an olefin-derived monomer having a polymerizable double bond in the molecule.

The olefin-derived monomer is not particularly limited, and, for example, α-olefin such as ethylene, propylene, 1-butene, 1-pentene, 1-hexene, 1-heptene, 1-octene, and 4-methyl-1-pentene, and diene such as butadiene may be exemplified.

The olefin-derived resin may have a polar group.

The olefin-derived resin may have a polar group by either polymerizing a monomer having a polar group to produce an olefin-derived resin, or introducing a polar group to a polymerized olefin-derived resin.

Examples of the polar group include a fluorine atom, a chlorine atom, a bromine atom, an iodine atom, and an ester group, as well as carboxyl group derivatives such as a carboxyl group, a carboxylic acid group, a carboxylic anhydride group, a carboxylic acid ester group, a carboxylic halide group, a carboxylic amide group, a carboxylic imide group and a carboxylic acid base, and a sulfonic acid group, a sulfonic acid ester group, a sulfonic chloride group, a sulfonic amide group, a sulfonic acid base, an epoxy group, an amino group, an oxazoline group, an epoxy group, and the like.

In embodiments, the olefin-derived resin includes a polar group wherein flame retardance may be improved.

The olefin-derived resin may be an acid modified resin.

The acid modified resin is obtained by modifying a resin such as polyethylene, polypropylene or an ethylene vinyl acetate copolymer with an unsaturated carboxylic acid such as maleic acid, itaconic acid or fumaric acid, or an unsaturated carboxylic acid diester such as a maleic acid monoester, a maleic acid diester, a fumaric acid diester, a maleic anhydride or an itaconic anhydride.

In embodiments, the acid modified resin may improve mechanical characteristics such as tensile strength and tensile elongation.

In embodiments, an acid modified resin may achieve more favorable dispersibility of the metal hydrate.

The olefin-derived resin which may be used in the present disclosure is, for example, polyethylene, polypropylene, an ethylene acrylic acid ester copolymer such as an ethylene vinyl acetate copolymer (EVA) or an ethylene ethyl acrylate copolymer (EEA), an ethylene α-olefin copolymer, an ethylene methyl acrylate copolymer, an ethylene butyl acrylate copolymer, an ethylene methyl methacrylate copolymer, an ethylene acrylic acid copolymer, partially saponified EVA, a maleic anhydride modified polyolefin, an ethylene acrylic acid ester maleic anhydride copolymer, and the like.

In embodiments, polyethylene, polypropylene, an ethylene vinyl acetate copolymer, an ethylene ethyl acrylate copolymer, and a maleic anhydride modified ethylene vinyl acetate copolymer may be utilized. These may be used alone, or as a mixture of two or more.

When the olefin-derived resin does not have a polar group, an acid modified olefin component may be blended in an amount of 5 parts by mass to 10 parts by mass relative to 100 parts by mass of the olefin-derived resin since more favorable dispersion of the flame retardant can be achieved.

The polymerization method of the olefin-derived resin is not particularly limited, and may be carried out according to a well-known process.

The polymerization may be carried out by either random copolymerization, or block copolymerization.

(B) Elastomer Resin

The resinous material for covering electric wire of the present disclosure contains an elastomer resin.

By including an elastomer resin, the tensile elongation of the resinous material for covering electric wire can be improved, in particular.

Examples of the elastomer resin include styrene-derived elastomers, olefin-derived elastomers, vinyl chloride-derived elastomers, urethane-derived elastomers, polyester-derived elastomers, polyamide-derived elastomers, acrylic elastomers, and the like. These may be used alone, or in combinations of two or more kinds thereof as needed.

When the resinous material for covering electric wire of the present disclosure is used as an insulating layer for directly covering a conductor, an olefin-derived elastomer may be utilized since deterioration of the electrical characteristics of the electric wire may be prevented.

In contrast, when the resinous material for covering electric wire of the present disclosure is used as a sheath, consideration of deterioration of the electrical characteristics is not necessary since the material does not directly cover the conductor. Thus, any elastomer resin can be used, and a styrene-derived elastomer can be suitably used due to high compatibility with the cyclic olefin-derived resin.

Specific examples of styrene-derived elastomer include SEBS (polystyrene-ethylene/butylene-styrene), SEPS (polystyrene-poly(ethylene/propylene) block-polystyrene), SEEPS (polystyrene-poly(ethylene-ethylene/propylene) block-polystyrene), SEBS (polystyrene-poly(ethylene/butylene) block-polystyrene), SEP (polystyrene-poly(ethylene/propylene) block), and the like.

(C) Cyclic Olefin-derived Resin

The cyclic olefin-derived resin imparts physical properties to the resinous material for covering electric wire. In addition, since a metal hydrate is used as the flame retardant described later in present disclosure, it is necessary to use a resin which is not subject to deterioration or decomposition owing to the flame retardant.

The cyclic olefin-based resin (C) used in the present disclosure contains a cyclic olefin component as a copolymer component, and is not particularly limited as long as it is a polyolefin resin having a glass transition point of from 120° C. to 170° C. and containing a cyclic olefin component in the main chain thereof.

For example, (a1) an addition polymer of cyclic olefin, or a hydrogenated product thereof, (a2) an addition copolymer of cyclic olefin and α-olefin, or a hydrogenated product thereof, and (a3) a ring-opening (co)polymer of cyclic olefin or a hydrogenated product thereof can be exemplified.

Moreover, the cyclic olefin-based resin containing a cyclic olefin component as a copolymer component used in the present disclosure includes (a4) a resin of any one of the above (a1) to (a3) being further grafted and/or copolymerized with an unsaturated compound having a polar group.

The polar group may include, for example, carboxyl groups, acid anhydride groups, epoxy groups, amide groups, ester groups, hydroxyl groups, or the like. Examples of the unsaturated compound having a polar group include (meth)acrylic acid, maleic acid, maleic anhydride, itaconic anhydride, glycidyl(meth)acrylate, (meth)acrylic acid alkyl (1 to 10 carbon atoms) esters, maleic acid alkyl (1 to 10 carbon atoms) esters, (meth)acrylamide, 2-hydroxyethyl (meth)acrylate, and the like.

In the present disclosure, one kind alone or a mixture of two or more kinds of the cycloolefin resins containing the cycloolefin component described above (a1)-(a4) as a copolymer component may be used.

In the present disclosure, the addition copolymer of cycloolefin and α-olefin, or a hydrogenated product thereof (a2) can be used.

In addition, a commercially available resin can be used for the cyclic olefin-based resin containing a cyclic olefin component as a copolymer component which may be used in the present disclosure.

The commercially available cyclic olefin-based resins may include, for example, TOPAS (registered trademark, manufactured by TOPAS Advanced Polymers), Apel (registered trademark, manufactured by Mitsui Chemical Co.), ZEONEX (registered trademark, manufactured by ZEON Corp.), ZEONOR (registered trademark, manufactured by ZEON Corp.), ARTON (registered trademark, manufactured by JSR Corp.), and the like.

The addition copolymer of cyclic olefin and α-olefin (a2) used in the composition of the present disclosure is not particularly limited.

Examples include copolymers containing [1] an α-olefin component having 2 to 20 carbon atoms and [2] a cyclic olefin component represented by the following general formula (I):

[formula 1]

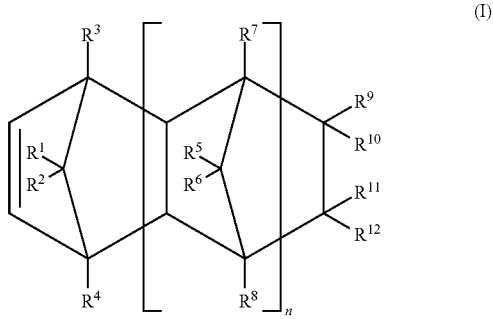

wherein, $R^1$ to $R^{12}$ may be the same or different from one another, and are each selected from the group consisting of a hydrogen atom, a halogen atom and a hydrocarbon group;

$R^9$ and $R^{10}$, and $R^{11}$ and $R^{12}$ may be combined to form a bivalent hydrocarbon group;

$R^9$ or $R^{10}$ may form a ring with $R^{11}$ or $R^{12}$ with each other;

n represents 0 or a positive integer; and when n is 2 or greater, $R^5$ to $R^8$ may be the same or different from one another, in each repeating unit.

[1] α-Olefin Component Having 2 to 20 Carbon Atoms

The α-olefin having 2 to 20 carbon atoms used in the present disclosure, which serves as a copolymer component of the addition polymer that is formed by copolymerization of the cycloolefin component and other copolymer component such as ethylene, is not particularly limited.

For example, ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene and the like can be included.

These α-olefin components may be used alone, or two or more kinds thereof may be used simultaneously. In embodiments, ethylene may be utilized.

[2] Cyclic Olefin Component Represented by the General Formula (I)

The cycloolefin component represented by the general formula (I) used in the present disclosure, which serves as a copolymer component in the addition polymer that is formed by copolymerization of the cycloolefin component and other copolymer components such as ethylene, are described.

$R^1$ to $R^{12}$ in the general formula (I) may be the same or different from one another, and are each selected from the group consisting of a hydrogen atom, a halogen atom, and a hydrocarbon group.

Specific examples of $R^1$ to $R^8$ may include, for example, a hydrogen atom; halogen atoms such as fluorine, chlorine and bromine; lower alkyl groups such as a methyl group, an ethyl group, a propyl group and a butyl group. These may be different from one another, partially different, or entirely the same.

Specific examples of $R^9$ to $R^{12}$ may include, for example, a hydrogen atom; halogen atoms such as fluorine, chlorine and bromine; alkyl groups such as a methyl group, an ethyl group, a propyl group, an isopropyl group, a butyl group, an isobutyl group, a hexyl group and a stearyl group; cycloalkyl groups such as a cyclohexyl group; substituted or unsubstituted aromatic hydrocarbon groups such as a phenyl group, a tolyl group, an ethylphenyl group, an isopropylphenyl group, a naphthyl group and an anthryl group; a benzyl group, a phenethyl group, and aralkyl groups formed by substitution of an alkyl group with an aryl group, and the like. These may be different from one another, partially different, or entirely the same.

Specific examples of the case in which $R^9$ and $R^{10}$, or $R^{11}$ and $R^{12}$ are combined to form a bivalent hydrocarbon group include, for example, alkylidene groups such as an ethylidene group, a propylidene group and an isopropylidene group, and the like.

When $R^9$ or $R^{10}$ forms a ring with $R^{11}$ or $R^{12}$, the resultant ring may be either monocyclic or polycyclic, may be polycyclic having crosslinking, may be a ring having a double bond, or may be a ring constituted with any combination of these rings.

In addition, these rings may include a substituent group such as a methyl group.

Specific examples of the cyclic olefin component represented by the general formula (I) include bicyclic cycloolefins such as bicyclo[2.2.1]hept-2-ene (common name: norbornene), 5-methyl-bicyclo[2.2.1]hept-2-ene, 5,5-dimethyl-bicyclo[2.2.1]hept-2-ene, 5-ethyl-bicyclo[2.2.1]hept-2-ene, 5-butyl-bicyclo[2.2.1]hept-2-ene, 5-ethylidene-bicyclo[2.2.1]hept-2-ene, 5-hexyl-bicyclo[2.2.1]hept-2-ene, 5-octyl-bicyclo[2.2.1]hept-2-ene, 5-octadecyl-bicyclo[2.2.1]hept-2-ene, 5-methylidene-bicyclo[2.2.1]hept-2-ene, 5-vinyl-bicyclo[2.2.1]hept-2-ene and 5-propenyl-bicyclo[2.2.1]hept-2-ene; tricyclic cycloolefins such as tricyclo[4.3.0.1$^{2,5}$]deca-3,7-diene (common name: dicyclopentadiene), tricyclo[4.3.0.1$^{2,5}$]dec-3-ene; tricyclo[4.4.0.1$^{2,5}$]undeca-3,7-diene or tricyclo[4.4.0.1$^{2,5}$]undeca-3,8-diene, or tricyclo[4.4.0.1$^{2,5}$]undec-3-ene that is a partially hydrogenated product (or an adduct of cyclopentadiene and cyclohexene) thereof; 5-cyclopentyl-bicyclo[2.2.1]hept-2-ene, 5-cyclohexyl-bicyclo[2.2.1]hept-2-ene, 5-cyclohexenyl bicyclo[2.2.1]hept-2-ene, and 5-phenyl-bicyclo[2.2.1]hept-2-ene; tetracyclic cycloolefins such as tetracyclo[4.4.0.1$^{2,5}$.1$^{7,10}$]dodec-3-ene (also simply referred to as tetracyclododecene), 8-methyltetracyclo[4.4.0.1$^{2,5}$.1$^{7,10}$]dodec-3-ene, 8-ethyltetracyclo[4.4.0.1$^{2,5}$.1$^{7,10}$]dodec-3-ene, 8-methylidenetetracyclo[4.4.0.1$^{2,5}$.1$^{7,10}$]dodec-3-ene, 8-ethylidenetetracyclo[4.4.0.1$^{2,5}$.1$^{7,10}$]dodec-3-ene, 8-vinyltetracyclo[4.4.0.1$^{2,5}$.1$^{7,10}$]dodec-3-ene and 8-propenyl-tetracyclo[4.4.0.1$^{2,5}$.1$^{7,10}$]dodec-3-ene; polycyclic cycloolefins such as 8-cyclopentyl-tetracyclo[4.4.0.1$^{2,5}$.1$^{7,10}$]dodec-3-ene, 8-cyclohexyl-tetracyclo[4.4.0.1$^{2,5}$.1$^{7,10}$]dodec-3-ene, 8-cyclohexenyl-tetracyclo[4.4.0.1$^{2,5}$.1$^{7,10}$]dodec-3-ene, 8-phenyl-cyclopentyl-tetracyclo[4.4.0.1$^{2,5}$.1$^{7,10}$]dodec-3-ene; tetracyclo[7.4.1$^{3,6}$.0$^{1,9}$.0$^{2,7}$]tetradeca-4,9,11,13-tetraene (may be also referred to as 1,4-methano-1,4,4a,9a-tetrahydrofluorene), tetracyclo[8.4.1$^{4,7}$.0$^{1,10}$.0$^{3,8}$]pentadeca-5,10,12,14-tetraene (may be also referred to as 1,4-methano-1,4,4a,5,10,10a-hexahydroanthracene); pentacyclo[6.6.1.1$^{3,6}$.0$^{2,7}$.0$^{9,14}$]-4-hexadecene, pentacyclo[6.5.1.1$^{3,6}$.0$^{2,7}$.9,13]-4-pentadecene, pentacyclo[7.4.0.0$^{2,7}$.1$^{3,6}$.1$^{10,13}$]-4-pentadecene; heptacyclo[8.7.0.1$^{2,9}$.1$^{4,7}$.1$^{11,17}$.0$^{3,8}$.0$^{12,16}$]-5-eicosene, heptacyclo[8.7.0.1$^{2,9}$.0$^{3,8}$.1$^{4,7}$.0$^{12,17}$.1$^{13,16}$]-14-eicosene; and tetramers of cyclopentadiene, and the like.

These cyclic olefin components may be used alone or in combinations of two or more kinds thereof. In embodiments, bicyclo[2.2.1]hept-2-ene (common name: norbornene) alone may be utilized.

The method for polymerizing [1] an α-olefin component having 2 to 20 carbon atoms and [2] a cyclic olefin component represented by the general formula (I), and the method for hydrogenating the resultant polymer are not especially limited, and can be carried out according to publicly known methods.

Although it may be carried out by either random copolymerization or block copolymerization, in embodiments random copolymerization may be utilized.

In addition, the polymerization catalyst that may be used is not particularly limited, and the polymer can be obtained by using a conventionally well-known catalyst such as a Ziegler-Natta series, metathesis series, or metallocene series catalyst according to a well known process.

The addition copolymer of cyclic olefin and α-olefin or the hydrogenated product thereof that is used in the present disclosure is manufactured by use of a metallocene series catalyst.

An exemplary metathesis catalyst may be a molybdenum or tungsten series metathesis catalyst that is well-known as a catalyst for ring-opening polymerization of cycloolefin (for example, as described in Japanese Unexamined Patent Applications, First Publication Nos. S58-127728, S58-129013, etc.).

In addition, the polymer obtained with the metathesis catalyst is hydrogenated using a transition metal catalyst supported on an inorganic support, at a rate of no less than 90% of the double bond in the main chain, and at a rate of no less than 98% of the carbon-carbon double bond in the aromatic ring of the side chain.

Other Copolymer Component

The addition copolymer of cyclic olefin and α-olefin (a2), used in the composition of the present disclosure, may contain, in addition to [1] the α-olefin component having 2 to 20 carbon atoms and [2] the cyclic olefin component represented by the general formula (I), other copolymerizable unsaturated monomer component as needed within a range not to impair the object of the present disclosure.

The unsaturated monomer, which may be optionally copolymerized, is not particularly limited, and for example, hydrocarbon based monomers including two or more carbon-carbon double bonds in one molecule and the like may be exemplified.

Specific examples of the hydrocarbon based monomer including two or more carbon-carbon double bonds in one molecule include: linear unconjugated diene such as 1,4-hexadiene, 1,6-octadiene, 2-methyl-1,5-hexadiene, 4-methyl-1,5-hexadiene, 5-methyl-1,5-hexadiene, 6-methyl-1,5-heptadiene and 7-methyl-1,6-octadiene; cyclic unconjugated diene such as cyclohexadiene, dicyclopentadiene, methyltetrahydroindene, 5-vinyl-2-norbornene, 5-ethylidene-2-norbornene, 5-methylene-2-norbornene, 5-isopropylidene-2-norbornene, 6-chloromethyl-5-isopropenyl-2-norbornene and 4,9,5,8-dimethano-3a,4,4a,5,8,8a,9,9a-octahydro-1H-benzoindene; 2,3-diisopropylidene-5-norbornene; 2-ethylidene-3-isopropylidene-5-norbornene; 2-propenyl-2,2-norbornadiene; and the like.

Among them, 1,4-hexadiene, 1,6-octadiene, and cyclic unconjugated diene, for example, dicyclopentadiene, 5-ethylidene-2-norbornene, 5-vinyl-2-norbornene, 5-methylene-2-norbornene, 1,4-hexadiene, and 1,6-octadiene may be utilized.

The cyclic olefin-derived resin may be used alone, or two or more kinds thereof may be used simultaneously.

In embodiments, ethylene may be utilized.

The cyclic olefin-derived resin used as an essential component of the present disclosure has a glass transition point of 120° C. to 170° C.

Since the resinous material for covering electric wire will have satisfactory heat resistance when the glass transition point is no lower than 120° C., the rate of reduction in thickness of the resinous material for covering electric wire as determined with a heat deformation test (according to JIS C3005) can be minimized to no greater than 40%.

When the glass transition point is no higher than 170° C., degradation of the flame retardant described later during compounding can be inhibited.

The glass transition point may range from 125° C. to 160° C.

The glass transition point can be adjusted by changing the proportion of the cyclic olefin component in the cyclic olefin-derived resin.

Also a cyclic olefin-derived resin having a glass transition point of lower than 120° C. can be used by blending with a cyclic olefin-derived resin having a glass transition point of no lower than 120° C.

Although the amount of the cyclic olefin-derived resin having a glass transition point of lower than 120° C. blended in this case is not particularly limited, the ratio may provide the blend of the cyclic olefin-derived resins having a Tg falling within the range of 120° C. to 170° C.

The melt viscosity of the cyclic olefin-derived resin is no less than 96 Pa·s when the shear rate is 1,216/sec at 260° C.

In general, flexibility is lowered when a cyclic olefin-derived resin is blended.

Although lowering of the flexibility is not preferred due to decreased tensile elongation, the cyclic olefin-derived resin having the melt viscosity of no less than 96 Pa·s may be utilized since lowering of the flexibility can be inhibited even if blended.

In embodiments, the melt viscosity is no less than 120 Pa·s.

(D) Flame Retardant

The flame retardant referred to herein is a metal hydrate.

Examples of the metal hydrate flame retardant include magnesium hydroxide ($Mg(OH)_2$), aluminum hydroxide ($Al(OH)_3$), hydrotalcite, calcium aluminate hydrate, calcium hydroxide, barium hydroxide, hard clay, and the like.

In the embodiment of the present disclosure, these are used either alone or a blended material of two or more thereof, as a metal hydrate-derived flame retardant.

As the metal hydrate-derived flame retardant, magnesium hydroxide is most suitable since it has the highest fire retardation effect.

In order to attain favorable conformability of the metal hydrate flame retardant with the resin in kneading, a surface treatment is carried out.

As a surface treating agent of the metal hydrate, a conventionally well-known surface treating agent may be used.

When the particle size of the metal hydrate is too large, insufficient dispersibility thereof may be attained to even lower the mechanical strength of the resinous material for covering electric wire. Thus, it is necessary to control to have a certain size.

Resinous Material for Covering Electric Wire

The resinous material for covering electric wire of the present disclosure has physical properties meeting or exceeding a required certain standard as an insulating material, a sheath or the like for covering electric wire by containing (A) the olefin-derived resin, (B) the elastomer resin, (C) the cyclic olefin-derived resin having a glass transition point of from 120° C. to 170° C., and (D) the flame retardant, which may also contain the aforementioned component.

In particular, lowering of the flexibility resulting from the cyclic olefin-derived resin can be compensated for by including the elastomer resin.

As a result, the resinous material for covering electric wire of the present disclosure can achieve favorable tensile elongation.

The resinous material for covering electric wire of the present disclosure has a tensile elongation (according to JIS C3005) of no less than 250%.

The tensile elongation can be imparted by in addition to the melt viscosity of the aforementioned cyclic olefin-derived resin, by blending the elastomer resin.

The tensile elongation is preferably no less than 300%. When the tensile elongation is no less than 300%, use for electric wires such as electric wires for vehicles is enabled.

In the present disclosure, the elastomer resin is included in an amount of 25 parts by mass to 60 parts by mass relative to 100 parts by mass of the cyclic olefin-derived resin.

The content of the elastomer resin of no less than 25 parts by mass may be utilized since lowering of the flexibility resulting from the cyclic olefin-derived resin is covered by the elastomer resin, whereby extremely favorable tensile elongation can be realized.

The content of the elastomer resin of no greater than 60 parts by mass is utilized since inhibition of the heat deformation is enabled.

The content of the elastomer resin is more preferably 30 parts by mass to 50 parts by mass.

The resinous material for covering electric wire of the present disclosure has a tensile strength (according to JIS C3005) of no less than 10 MPa.

The tensile strength is no less than 12 MPa.

In the resinous material for covering electric wire of the present disclosure, the mass ratio of the olefin-derived resin to the combined amount of the elastomer resin and the cyclic olefin-derived resin [(A)/((B)+(C))] is from 80/20 to 60/40.

The resinous material for covering electric wire preferably contains the olefin-derived resin as a principal component as described above because mechanical characteristics such as tensile strength can be imparted to the resinous material for covering electric wire of the present disclosure.

In regard to the aforementioned mass ratio, the ratio of the olefin-derived resin beyond 60/40 is preferred in light of maintaining the toughness. Whereas, the ratio of the olefin-derived resin less than 80/20 is also preferred since the effects of improving the tensile elongation by the elastomer resin and improving the heat resistance (thermal deformation) by the cyclic olefin-derived resin can be markedly exhibited in combination.

The JIS standard of the heat deformation rate (according to JIS C3005) is no greater than 50%, but no greater than 40% can be realized in the present disclosure as described above.

Therefore the resinous material can be used also in electric wires for vehicles.

Particularly, in the case of olefin resins such as polypropylene having high crystallinity, after subjecting to a heat treatment under conditions of 120° C. for 30 hrs, cracks are likely to be generated on the surface of a resinous material for covering electric wire by self-diameter winding; however, the crack is less likely to be generated by blending the cyclic olefin-derived resin.

The resinous material for covering electric wire of the present disclosure is used for a sheath, etc., of a flame-retardant cable which requires flame retardance.

The resinous material for covering electric wire of the present disclosure leads to natural slaking in a flame test (according to JIS C3005) within 60 sec after ignition.

In the resinous material for covering electric wire of the present disclosure, the content of the flame retardant is 60 parts by mass to 150 parts by mass relative to 100 parts by mass of the total content of the olefin-derived resin, the elastomer resin and the cyclic olefin-derived resin.

The content of the flame retardant of no less than 60 parts by mass is preferred since the flame retardance capable of achieving satisfactory results in the aforementioned flame test, whereas the content of no greater than 150 parts by mass is preferred since lowering of the flexibility of the resinous material for covering electric wire can be prevented.

The content of the flame retardant in the present disclosure is 70 parts by mass to 130 parts by mass.

To the cyclic olefin-derived resin of the present disclosure can be added other thermoplastic resin, various compounding agents, and the like as needed, within a range not impairing the effects of the present disclosure.

Illustrative examples of the other resin include, for example, other polyolefin resins, polystyrene resins, fluorine resins, and the like.

These other resins may be used alone or in a combination of two or more.

Moreover, to the resinous material for covering electric wire of the present disclosure may be added additives such as an auxiliary flame retardant agent, an antioxidant, a lubricant, a surface active agent, a softening agent, a plasticizer, an inorganic filler, a compatibility accelerator, a stabilizer, a crosslinking agent, an ultraviolet ray absorbing agent, a light stabilizer, and a colorant as needed.

In addition, when the resinous material for covering electric wire of the present disclosure will be in contact with a metal such as copper employed as a conductor, addition of a heavy metal resistant stabilizer is preferred.

Illustrative examples of the heavy metal resistant stabilizer include salicylic acid derivatives (for example, trade name ADKSTAB™ CDA6), hydrazide derivatives (for example, trade name IRGANOX® MD1024), oxalic amide derivatives (for example, trade name NAUGARD® XL-1), sulfur-containing phosphite compounds (for example, trade name HOSTANOX® OSP-1) and the like, and the type of the heavy metal resistant stabilizer is not particularly limited as long as characteristics of the coaxial cable are not impaired.

Also, the amount of the heavy metal resistant stabilizer added is not particularly limited, and in general, the amount of addition of no greater than 0.3% by weight based on the resin component is preferably employed.

Although the addition method is not particularly limited, it is beneficial to add beforehand to the cyclic polyolefin based resin, the polyethylene resin, other added resin, or the like.

In the method for producing the resinous material for covering electric wire of the present disclosure, a conventionally well-known process may be employed.

For example, dry blending with various types of mixer can be carried out. Alternatively, a melt kneading method performed using a common mixer such as a banbury mixer, a single screw extruder, a twin screw extruder, kneader, a multi screw extruder, or rollers, or a method in which each component is dissolved or dispersed to permit mixing, and the solvent is removed by heating, or the like may be employed.

In the present disclosure, a melt mixing method performed using an extruder is preferred in light of productivity, and favorable kneading performances.

Although the shape of the resulting resinous material for covering electric wire is not particularly limited, the shape may be tube-like, pellet-like, sheet-like, strand-like, chip-like, or the like.

In addition, after the melt kneading, the material may be extruded to cover a conductor or the like, thereby capable of manufacturing a molded product.

In production of the resinous material for covering electric wire of the present disclosure, a pellet may be produced beforehand by blending the elastomer resin with the cyclic olefin-derived resin, and the pellet may then be used as a raw material.

Kneading beforehand may be performed such that possible preparation range of the material for securing good balance of elongation and heat deformation can be extended.

The resinous material for covering electric wire of the present disclosure is used for covering an electric wire, for example, as described later.

Since the resinous material for covering electric wire of the present disclosure has favorable mechanical strength and heat resistance, it can be used as an insulating layer for directly covering a conductor, or as a sheath covering the outer periphery of a single wire or an electric wire bundle of multiple electric wires having a covering of an insulating layer.

Electric Wire

An electric wire prevents short circuits by covering a conductor such as copper as a core wire with an insulating material therearound, and is a linear material that transfers predominantly electric power and information by allowing an electric current to flow through the core wire.

One core wire may be included, or multiple core wires may be included.

Specific examples of the electric wire include insulated wires for communication cables, electric power cables such as general fixed electric wires, wires for marine application and electric wires for wheeled vehicles, as well as cables for cameras, cables for medical applications, and the like.

In the method for manufacturing the electric wire of the present disclosure, conventionally well-known method may be employed.

More specifically, the electric wire may be obtained by extrusion of the resinous material for covering electric wire of the present disclosure over a conductor such as single or multiple copper core wire(s) using a common extrusion molding line.

Flame-Retardant Cable

In electric generation plants, large plants for iron manufacture, petrochemical processing, etc., as well as buildings, underground malls and the like, the need for firestop cables has increased, and in particular, flame-retardant cables have been used recently in light of fire safety.

A flame-retardant cable refers to those manufactured by covering a conductor with an insulating material, and further covering its outer periphery with a flame retardant sheath.

In addition, those manufactured by bundling electric wires manufactured by covering a conductor with an insulating material, and then covering thus obtained electric wire bundle with a sheath are also included.

Moreover, in the flame-retardant cable of the present disclosure, a conductor may be covered with an insulating material via another layer (for example, fire resistant layer), and a sheath may cover around thus covered insulating material via a filler.

It should be noted that the "electric wire" used in explaining the flame-retardant cable includes all general electric wires other than the electric wire of the present disclosure.

The resinous material for covering electric wire of the present disclosure may be used as an insulating material for covering a conductor, or as a sheath for covering an electric wire, etc.

The method for manufacturing the flame-retardant cable of the present disclosure is not particularly limited, and the flame-retardant cable can be manufactured by a conventionally well-known method.

For example, the flame-retardant cable can be obtained using an electric wire bundle manufactured by bundling the electric wires covered with an insulating layer in a plurality of numbers as needed, or using single electric wire, by covering the outer periphery with a sheath by extrusion.

EXAMPLES

Hereinafter, the present disclosure is explained in more detail with reference to Examples, but the present disclosure is not limited to these Examples.

Material

Base Resin

Polyethylene (PE): manufactured by Nippon Unicar Company Limited, NUC Polyethylene-LL NUCG-5225

Ethylene-vinyl acetate copolymer (EVA): manufactured by Du Pont-Mitsui Polychemicals Company Ltd., Evaflex EV270

Ethylene-ethyl acrylate copolymer (EEA): manufactured by Nippon Unicar Company Limited, Ethylene ethyl acrylate copolymer DPDJ-6169BK Polypropylene (PP): manufactured by Prime Polymer Co., Ltd., Prime Polypro J-750HP Maleic anhydride modified EVA (MAH-EVA): manufactured by Du Pont-Mitsui Polychemicals Company Ltd., HPR VR103

Cyclic Olefin-Derived Resin

TOPAS: Five types of cyclic olefin resins manufactured by TOPAS Advanced Polymers were used.

ZEONOR: manufactured by Nippon ZEON Co., Ltd., ZEONOR 1420R was used.

The glass transition point (Tg) and the melt viscosity (MV) of these TOPAS are shown in Table 1.

As the glass transition point (Tg) of the cyclic olefin resin used in the present disclosure, a value determined according to a method of JIS K7121 under conditions of a rate of temperature increase of 10° C./min is employed.

In addition, as the melt viscosity of the cyclic olefin resin used in the present disclosure, a value determined at 260° C., and a shear rate of 1,216/sec is employed.

TABLE 1

| | Product Name | Tg(° C.) | MV ( Pa · s) |
| --- | --- | --- | --- |
| TOPAS8007 | TOPAS8007F-04 | 80 | 111 |
| TOPAS5013 | TOPAS5013S-04 | 136 | 81 |
| TOPAS6013 | TOPAS6013F-04 | 140 | 162 |
| TOPAS6015 | TOPAS6015S-04 | 160 | 280 |
| TOPAS6017 | TOPAS6017S-04 | 180 | 390 |
| ZEONOR | ZEONOR1420R | 136 | 460 |

Elastomer

Olefin-derived elastomer: manufactured by DuPont Dow Elastomers, Engage ENR7380

Styrene-derived elastomer: manufactured by Kraton, Kraton D1184

Flame retardant; Metal Hydrate

Magnesium hydroxide: manufactured by Kyowa Chemical Industry Co., Ltd., KISUMA 5A Aluminum hydroxide: manufactured by Showa Denko K. K., HIGILITE H-42M Production of Resinous Material for Covering Electric Wire The elastomer resin was blended with the cyclic olefin-derived resin at ratios shown in Tables 2 to 5 to produce pellets beforehand of a cyclic olefin-derived resin/elastomer resin blend by melt kneading in the preset temperature range of from 260° C. to 280° C. with a twin screw extruder.

Next, the blend, the base resin, and the flame retardant were blended at ratios shown in Tables 2 to 5, and subjected to melt kneading with a twin screw extruder in the preset temperature range of from 180° C. to 200° C. to produce a pelletized resinous material for covering electric wire.

As a result of measuring the molten resin temperature immediately after discharging from a die in the melt kneading, all Examples and Comparative Examples other than Comparative Example 6 exhibited a molten resin temperature of no higher than 215° C.

The molten resin temperature in Comparative Example 6 fell in the range of from 230° C. to 240° C.

Manufacture of Electric Wire

The aforementioned pelletized covering material was placed into a single screw extruder equipped with a screw having a diameter of 20 mm to which a wire coating die was attached, and the covering material was subjected to melt extrusion at a preset temperature of 180° C. A conductor (copper wire) having a diameter of 0.9 mm which had been heated to 80° C. beforehand was introduced into a wire coating die, and then the conductor was covered with an insulating covering layer having a thickness of 0.3 mm by extrusion covering while drawing to manufacture an electric wire.

The compositions and the characteristics of thus obtained electric wire insulating layer are shown in Table 2 to Table 4.

Production of Flame-Retardant Cable

Three aforementioned electric wires and a jute filler were bundled, and a cable core was manufactured using a PET press rolled tape.

This cable core was covered with the covering material of Examples 17 to 20 through a coating die using a single screw extruder at 180° C. to give a sheath thickness of 1 mm, whereby a flame-retardant cable was manufactured.

The compositions and the characteristics of thus obtained sheath are shown in Table 5.

Heat Deformation Test

A heat deformation test was performed according to JIS-C3005 at a temperature of 120° C., with a load of 2 kg.

When the thermal deformation of the insulating covering layer and the sheath layer was no greater than 40%, an evaluation was made as acceptable.

Flame Test

A 60-degree inclined flame test was performed according to JIS C3005.

An evaluation was made as acceptable when natural slaking occurred within 60 sec after the ignition.

An evaluation was made as unacceptable when combustion continued over 60 sec.

Tensile Test

A tensile test of the insulating covering layer of the electric wire was performed according to JIS C3005.

The conductor of the electric wire was pulled out, and the tube of the insulating layer was subjected to the tensile test at a room temperature and a tensile speed of 200 mm/min, whereby the tensile strength and elongation were measured.

The sheath was also subjected to the same test after removing the electric wire and the filler tape.

Evaluations were made as acceptable when the tensile elongation was no less than 250%, and when the tensile strength was no less than 10 MPa.

Aging Test

After the electric wire and the sheath-covered cable were subjected to a heat treatment under a condition of 120° C. for 36 hrs, followed by self-diameter winding, an evaluation was made as acceptable when no crack was generated on the surface of the insulating covering layer or the sheath.

TABLE 2

|  | Comparative Example 1 | Comparative Example 2 | Comparative Example 3 | Comparative Example 4 | Example 1 | Example 2 | Example 3 | Example 4 | Example 5 |
|---|---|---|---|---|---|---|---|---|---|
| PE | 100 |  |  |  | 60 |  |  |  |  |
| EVA |  | 100 |  |  |  | 70 |  |  | 65 |
| EEA |  |  | 100 |  |  |  | 70 |  |  |
| PP |  |  |  | 100 |  |  |  | 60 |  |
| MAH-EVA |  |  |  |  |  |  |  |  | 5 |
| TOPAS6013 |  |  |  |  | 25 | 20 | 20 | 25 | 20 |
| Styrene-derived elastomer |  |  |  |  | 15 | 10 |  | 15 |  |
| Olefin-derived elastomer |  |  |  |  |  |  | 10 |  | 10 |
| Magnesium hydroxide | 100 | 100 | 100 | 100 | 100 | 100 | 100 | 100 | 100 |
| Heat Deformation (%) | unacceptable 71 | unacceptable 65 | unacceptable 55 | unacceptable 53 | acceptable 39 | acceptable 23 | acceptable 21 | acceptable 33 | acceptable 20 |
| flame resistance | acceptable | acceptable | acceptable | acceptable | acceptable | acceptable | acceptable | acceptable | acceptable |
| tensile strength (Mpa) | 14 | 12 | 10 | 10 | 15 | 12 | 11 | 11 | 14 |
| tensile elongation (%) | acceptable 420 | acceptable 520 | acceptable 530 | acceptable 510 | acceptable 255 | acceptable 290 | acceptable 320 | acceptable 280 | acceptable 305 |
| anti-aging performance | acceptable | acceptable | acceptable | unacceptable | acceptable | acceptable | acceptable | acceptable | acceptable |

TABLE 3

|  | Comparative Example 5 | Comparative Example 6 | Comparative Example 7 | Example 2 | Example 6 | Example 7 | Example 8 |
|---|---|---|---|---|---|---|---|
| EVA | 70 | 70 | 70 | 70 | 70 | 70 | 70 |
| TOPAS8007 | 20 |  |  |  |  |  | 5 |
| TOPAS5013 |  |  | 20 |  |  |  |  |
| TOPAS6013 |  |  |  | 20 |  |  | 15 |
| TOPAS6015 |  |  |  |  | 20 |  |  |
| TOPAS6017 |  | 20 |  |  |  |  |  |
| ZEONOR |  |  |  |  |  | 20 |  |
| Styrene-derived elastomer | 10 | 10 | 10 | 10 | 10 | 10 | 10 |
| Magnesium hydroxide | 100 | 100 | 100 | 100 | 100 | 100 | 100 |
| Heat Deformation (%) | unacceptable 48 | acceptable 17 | acceptable 26 | acceptable 23 | acceptable 21 | acceptable 22 | acceptable 28 |
| flame resistance | acceptable | unacceptable | acceptable | acceptable | acceptable | acceptable | acceptable |
| Tensile strength (Mpa) | 15 | 13 | 11 | 12 | 12 | 14 | 14 |
| tensile elongation (%) | acceptable 350 | unacceptable 180 | unacceptable 160 | acceptable 290 | acceptable 270 | acceptable 300 | acceptable 305 |
| anti-aging performance | acceptable | acceptable | acceptable | acceptable | acceptable | acceptable | acceptable |

TABLE 4

|  | Example 9 | Example 10 | Example 11 | Example 12 | Comparative Example 8 | Example 13 | Example 14 |
|---|---|---|---|---|---|---|---|
| EVA | 60 | 60 | 70 | 80 | 60 | 60 | 60 |
| TOPAS6013 | 30 | 24 | 24 | 15 | 25 | 25 | 25 |
| Styrene-derived elastomer | 10 | 16 | 6 | 5 |  |  |  |
| Olefin-derived elastomer |  |  |  |  | 15 | 15 | 15 |
| Magnesium hydroxide | 100 | 100 | 100 | 100 | 50 | 75 |  |
| Aluminum hydroxide |  |  |  |  |  |  | 150 |
| Heat Deformation (%) | acceptable 20 | acceptable 21 | acceptable 18 | acceptable 36 | unacceptable 43 | acceptable 38 | acceptable 18 |
| flame resistance | acceptable | acceptable | acceptable | acceptable | unacceptable | acceptable | acceptable |
| tensile strength (Mpa) | 13 | 14 | 12 | 13 | 15 | 15 | 11 |
| tensile elongation (%) | acceptable 275 | acceptable 295 | acceptable 260 | acceptable 310 | acceptable 505 | acceptable 425 | acceptable 250 |
| anti-aging performance | acceptable | acceptable | acceptable | acceptable | acceptable | acceptable | acceptable |

TABLE 5

|  | Example 15 | Example 16 | Example 17 | Example 18 |
|---|---|---|---|---|
| EVA | 70 | 60 |  |  |
| EEA |  |  | 70 |  |
| PP |  |  |  | 60 |
| TOPAS6013 | 20 | 25 | 20 | 25 |
| Styrene-derived elastomer | 10 | 15 |  | 15 |
| Olefin-derived elastomer |  |  | 10 |  |
| Magnesium hydroxide | 100 | 100 | 100 | 100 |
| Heat Deformation (%) | acceptable 25 | acceptable 22 | acceptable 22 | acceptable 36 |
| flame resistance | acceptable | acceptable | acceptable | acceptable |
| tensile strength (Mpa) | 12 | 14 | 12 | 11 |
| tensile elongation (%) | acceptable 280 | acceptable 285 | acceptable 310 | acceptable 270 |
| anti-aging performance | acceptable | acceptable | acceptable | acceptable |

As is clear from Table 2, none of Comparative Examples 1 to 4 was acceptable in the heat deformation test.

On the other hand, Examples 1 to 5 were all acceptable in the heat deformation test.

Accordingly, it was ascertained that the heat resistance was improved and the heat deformation was inhibited when the insulating layer contained a cyclic olefin-derived resin.

Furthermore, Examples 3 and 5 particularly exhibited superior effects among Examples 1 to 5.

Thus, it was ascertained that an ethylene ethyl acrylate copolymer was particularly preferred among the olefin-derived resins having a polar group, and that the insulating layer contained an acid modified resin.

As is clear from Table 3, Comparative Examples 5 to 6 and Examples in which the cyclic olefin-derived resin has a glass transition point falling within the range of 120° C. to 170° C. revealed both favorable mechanical characteristics such as tensile elongation, and heat resistance such as lower susceptibility to heat deformation.

Comparative Example 7 and Example 7 reveals that the cyclic olefin-derived resin having a melt viscosity of no less than 96 Pa·s improves mechanical characteristics such as tensile elongation.

Example 8 reveals that the cyclic olefin-derived resin used in the present disclosure provides an insulating layer having superior mechanical strength such as tensile elongation when the resin contains a small amount of a cyclic olefin-derived resin having a low glass transition point.

As is clear from Table 4, Comparative Example 8 and Example 13 reveal that when the flame retardant is included at a lower content, heat deformation is more likely to occur, leading to failure in acceptance in the heat deformation test.

In addition, Example 13 reveals that a higher content of the elastomer resin results in an insulating layer having superior mechanical characteristics such as tensile elongation.

Example 14 reveals that a higher content of the flame retardant tends to result in inferior mechanical characteristics such as tensile elongation.

As shown in Table 5, Example 15 to Example 18 reveal that heat deformation rate, tensile characteristics, flame retardance, anti-aging properties were all acceptable, thereby capable of providing a superior sheath.

The invention claimed is:

1. A resinous material for covering electric wire comprising:
   (A) an olefin-derived resin having a polar group; wherein the polar group is selected from the group consisting of an ester group, a carboxyl group, a carboxylic acid group, a carboxylic anhydride group, a carboxylic acid ester group, a carboxylic halide group, a carboxylic amide group, a carboxylic imide group, a carboxylic acid base, and combination thereof;
   (B) a elastomer resin;
   (C) a copolymer containing an α-olefin component having 2 to 20 carbon atoms and a cyclic olefin component of formula I having a glass transition point of from 120° C. to 170° C.;

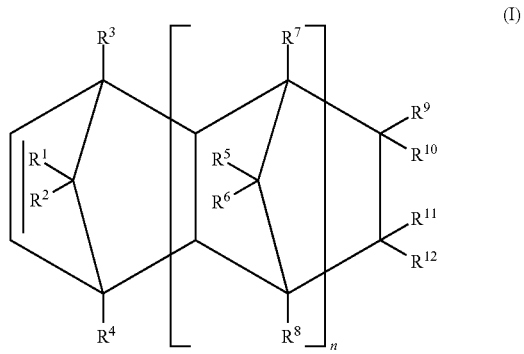

wherein $R^1$ to $R^{12}$ may be the same or different from one another, and are each selected from the group consisting of a hydrogen atom, a halogen atom, and a hydrocarbon group;

$R^9$ and $R^{10}$, and $R^{11}$ and $R^{12}$, may be combined to form a bivalent hydrocarbon group;

$R^9$ or $R^{10}$ may form a ring with $R^{11}$ or $R^{12}$ or with each other, n is 0 or a positive integer; and when n is 2 or greater, $R^5$ and $R^8$ may be the same or different from one another, in each repeating unit; and (D) a flame retardant, wherein the mass ratio of the component (A) to the combined amount of the components (B) and (C)[(A)/((B)+(C))] is from 80/20 to 60/40;

said resinous material for covering electric wire contains 25 parts by mass to 60 parts by mass of the component (B) relative to 100 parts by mass of the component (C);

the melt velocity of the component (C) is from 162 Pa·s to 460 Pa·s when the shear rate is 1,216/sec at 260° C.;

the content of the component (D) is from 75 parts by mass to 150 parts by mass relative to 100 parts by mass of the total contents of the components (A), (B) and (C), the resinous material having; a tensile elongation of no less than 250% to 425%; and a heat deformation rate of from 18% to no greater than 40%.

2. The resinous material for covering electrical wire according to claim 1, wherein the component (B) is an olefin-derived elastomer.

3. The resinous material for covering electrical wire according to claim 1, wherein the component (B) is a styrene-derived elastomer.

4. An electric wire wherein the resinous material for covering electric wire according to claim 1 covers a conductor.

5. A flame-retardant cable provided with a sheath covering the outer periphery of a single wire, said sheath being formed with the resinous material for covering electric wire according to claim 1.

6. A flame-retardant cable provided with a sheath covering the outer periphery of an electric wire bundle of multiple electric wires, said sheath being formed with the resinous material for covering electric wire according to claim 1.

* * * * *